US009047103B2

(12) United States Patent
Fortune et al.

(10) Patent No.: US 9,047,103 B2
(45) Date of Patent: Jun. 2, 2015

(54) RESOURCE INDEX IDENTIFYING MULTIPLE RESOURCE INSTANCES AND SELECTING MOST APPROPRIATE UI RESOURCE INSTANCE BASED ON WEIGHTED RESOURCE REQUEST CONDITIONS

(75) Inventors: Erik Fortune, Redmond, WA (US); Rylan M. Hawkins, Seattle, WA (US); Peter G. Constable, Redmond, WA (US); Sunggook Chue, Redmond, WA (US); Dennis Y. Chi, Seattle, WA (US); Laura Gonzalez Gomez, Seattle, WA (US); Jayashree Sadagopan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 599 days.

(21) Appl. No.: 12/974,747

(22) Filed: Dec. 21, 2010

(65) Prior Publication Data

US 2012/0159260 A1   Jun. 21, 2012

(51) Int. Cl.
*G06F 11/07* (2006.01)
*G06F 9/46* (2006.01)
(Continued)

(52) U.S. Cl.
CPC .............. *G06F 9/4448* (2013.01); *G06F 9/48* (2013.01); *G06F 9/50* (2013.01); *G06F 2209/485* (2013.01); *G06F 9/5055* (2013.01); *G06F 9/5044* (2013.01); *G06F 9/4443* (2013.01)

(58) Field of Classification Search
CPC .............. G06F 9/48; G06F 9/50; G06F 9/52; G06F 9/5066; G06F 9/5044; G06F 9/5055

USPC .................. 718/104; 714/38.1, E11.024
See application file for complete search history.

(56) References Cited

U.S. PATENT DOCUMENTS

| 6,704,776 B1 | 3/2004 | Fortune |
| 7,146,353 B2 | 12/2006 | Garg et al. |

(Continued)

FOREIGN PATENT DOCUMENTS

| CN | 1235313 | 11/1999 |
| CN | 1561043 | 1/2005 |

(Continued)

OTHER PUBLICATIONS

"Base Class Library Performance Tips and Tricks", Retrieved at << msdn.microsoft.com/en-us/magazine/cc163670.aspx >>, Jan. 2006, pp. 8.

(Continued)

*Primary Examiner* — Meng An
*Assistant Examiner* — Abu Ghaffari
(74) *Attorney, Agent, or Firm* — Jim Banowsky; Kate Drakos; Micky Minhas (57) ABSTRACT

A resource index on a computing device identifies multiple resource instances (e.g., multiple user interface (UI) resource instances) of multiple resource items (e.g., of multiple UI resource items), each resource instance having one or more resource instance conditions. In response to a request for a resource item received from an application, a determination is made based on the resource index of one of the multiple resource instances that satisfy conditions associated with the request, and the one of the multiple resource instances is returned to the application. Additionally, the resource index can be used to identify potential errors in running an application in various potential contexts.

20 Claims, 5 Drawing Sheets

(51) Int. Cl.
*G06F 9/44* (2006.01)
*G06F 9/48* (2006.01)
*G06F 9/50* (2006.01)

(56) References Cited

U.S. PATENT DOCUMENTS

| | | | |
|---|---|---|---|
| 7,178,142 | B2 | 2/2007 | Bennett et al. |
| 7,356,615 | B2 | 4/2008 | Cai et al. |
| 7,451,219 | B2 | 11/2008 | Brey et al. |
| 7,454,516 | B1 | 11/2008 | Weinert et al. |
| 7,584,262 | B1 | 9/2009 | Wang et al. |
| 7,644,061 | B1 | 1/2010 | Fallis et al. |
| 7,673,299 | B2 | 3/2010 | Bennett et al. |
| 7,685,331 | B2 | 3/2010 | Wang et al. |
| 7,720,907 | B2 | 5/2010 | Brey et al. |
| 7,757,227 | B2 | 7/2010 | Duplessis et al. |
| 7,814,492 | B1 | 10/2010 | Creemer et al. |
| 7,831,975 | B2 * | 11/2010 | Ode ............ 718/104 |
| 7,962,470 | B2 | 6/2011 | Degenkolb et al. |
| 7,971,198 | B2 | 6/2011 | Almeida |
| 8,015,301 | B2 | 9/2011 | Carter et al. |
| 8,151,080 | B2 | 4/2012 | Naganuma et al. |
| 8,191,060 | B2 | 5/2012 | Malasky et al. |
| 8,224,804 | B2 | 7/2012 | Unnikrishnan et al. |
| 8,271,761 | B2 | 9/2012 | Naganuma et al. |
| 8,275,888 | B2 | 9/2012 | Branigan et al. |
| 8,276,121 | B2 | 9/2012 | Miller et al. |
| 8,302,100 | B2 * | 10/2012 | Deng et al. ............ 718/104 |
| 8,341,185 | B2 | 12/2012 | Sathish |
| 8,341,595 | B2 | 12/2012 | Arner et al. |
| 8,423,746 | B2 | 4/2013 | Naganuma et al. |
| 2004/0158480 | A1 | 8/2004 | Lubars et al. |
| 2005/0273507 | A1 | 12/2005 | Yan et al. |
| 2006/0085474 | A1 | 4/2006 | Tsubono |
| 2006/0106927 | A1 | 5/2006 | Brey et al. |
| 2006/0136401 | A1 | 6/2006 | Normington |
| 2006/0242288 | A1 * | 10/2006 | Masurkar ............ 709/223 |
| 2006/0271341 | A1 | 11/2006 | Brown et al. |
| 2006/0288044 | A1 | 12/2006 | Kashiwagi et al. |
| 2007/0038992 | A1 | 2/2007 | Mahasintunan |
| 2007/0168264 | A1 | 7/2007 | Slone et al. |
| 2007/0256048 | A1 | 11/2007 | Relyea et al. |
| 2007/0294699 | A1 | 12/2007 | Bahl et al. |
| 2008/0065664 | A1 | 3/2008 | Kehn et al. |
| 2008/0082490 | A1 | 4/2008 | MacLaurin et al. |
| 2008/0313331 | A1 | 12/2008 | Boykin et al. |
| 2009/0063396 | A1 | 3/2009 | Gangarapu et al. |
| 2009/0070769 | A1 | 3/2009 | Kisel |
| 2009/0094609 | A1 | 4/2009 | Burukhin et al. |
| 2009/0187727 | A1 | 7/2009 | Caprioli et al. |
| 2009/0216707 | A1 | 8/2009 | Keohane et al. |
| 2009/0222787 | A1 | 9/2009 | Aldahleh et al. |
| 2009/0228676 | A1 | 9/2009 | Naganuma et al. |
| 2009/0228879 | A1 | 9/2009 | Blohm et al. |
| 2009/0240811 | A1 * | 9/2009 | Wei et al. ............ 709/226 |
| 2009/0271762 | A1 | 10/2009 | Taylor et al. |
| 2009/0276783 | A1 | 11/2009 | Johnson et al. |
| 2009/0292545 | A1 | 11/2009 | Mohammed et al. |
| 2009/0328028 | A1 | 12/2009 | O'Rourke et al. |
| 2010/0011368 | A1 | 1/2010 | Arakawa et al. |
| 2010/0083219 | A1 | 4/2010 | Tavares et al. |
| 2010/0094900 | A1 | 4/2010 | Hughes, Jr. |
| 2010/0131922 | A1 | 5/2010 | Shenfield et al. |
| 2010/0138818 | A1 | 6/2010 | Harrop et al. |
| 2010/0138825 | A1 | 6/2010 | Harrop |
| 2010/0161778 | A1 * | 6/2010 | Guinard et al. ............ 709/222 |
| 2010/0199261 | A1 | 8/2010 | Shenfield et al. |
| 2010/0228861 | A1 * | 9/2010 | Arsovski et al. ............ 718/104 |
| 2010/0235844 | A1 | 9/2010 | Arwe et al. |
| 2011/0022582 | A1 | 1/2011 | Unnikrishnan et al. |
| 2011/0113327 | A1 | 5/2011 | Hagelund |
| 2011/0213884 | A1 * | 9/2011 | Ferris et al. ............ 709/226 |
| 2011/0246438 | A1 | 10/2011 | Sathish |
| 2011/0258407 | A1 | 10/2011 | Naganuma et al. |
| 2011/0276939 | A1 | 11/2011 | Frankin et al. |
| 2012/0081395 | A1 | 4/2012 | Adi et al. |
| 2012/0159439 | A1 | 6/2012 | Kaplinger et al. |
| 2012/0166513 | A1 | 6/2012 | Fortune et al. |
| 2012/0167046 | A1 | 6/2012 | Jones et al. |
| 2012/0167111 | A1 | 6/2012 | Fortune et al. |
| 2012/0191941 | A1 | 7/2012 | Naganuma et al. |
| 2012/0272204 | A1 | 10/2012 | Olewski et al. |
| 2013/0047150 | A1 | 2/2013 | Malasky et al. |
| 2013/0290930 | A1 | 10/2013 | Fortune et al. |
| 2014/0019953 | A1 | 1/2014 | Kolesnikov et al. |

FOREIGN PATENT DOCUMENTS

| | | |
|---|---|---|
| CN | 1804823 | 7/2006 |
| CN | 101313300 | 11/2008 |
| CN | 101416188 | 4/2009 |
| CN | 101526884 | 9/2009 |
| WO | WO 2006063617 A1 * | 6/2006 |

OTHER PUBLICATIONS

Stets, et al., "Component-based Operating System APIs: A Versioning and Distributed Resource Solution", Retrieved at << research.microsoft.com/pubs/69712/tr-99-24.doc >>, Jul. 1999, pp. 37.

"Application Resources", Retrieved at << developer.android.com/guide/topics/resources/index.html >>, Sep. 12, 2010, pp. 2.

"Resource Dictionaries", Retrieved at << msdn.microsoft.com/en-us/library/cc903952%28VS.95%29.aspx >>,—Retrieved Date: Sep. 22, 2010, pp. 8.

"Foreign Office Action", CN Application No. 201110432289.0, Feb. 8, 2014, 11 Pages.

"Final Office Action", U.S. Appl. No. 12/979,356, May 13, 2013, 9 Pages.

"Foreign Office Action", CN Application No. 201110432289.0, Oct. 15, 2014, 9 Pages.

"Foreign Office Action", CN Application No. 201110437575.6, Jan. 13, 2014, 12 pages.

"Foreign Office Action", CN Application No. 201110437575.6, Aug. 28, 2014, 7 pages.

"Foreign Office Action", CN Application No. 201110446908.1, Jan. 6, 2014, 9 Pages.

"Foreign Office Action", CN Application No. 201110446908.1, Sep. 12, 2014, 14 pages.

"Non-Final Office Action", U.S. Appl. No. 12/977,113, Dec. 20, 2012, 21 pages.

"Non-Final Office Action", U.S. Appl. No. 12/979,356, Mar. 5, 2013, 13 Pages.

"Non-Final Office Action", U.S. Appl. No. 13/926,861, May 29, 2014, 20 Pages.

"Non-Final Office Action", U.S. Appl. No. 13/926,861, Oct. 2, 2014, 17 pages.

"Notice of Allowance", U.S. Appl. No. 12/977,113, Mar. 19, 2013, 13 pages.

Banga, et al., "Resource Containers: A New Facility for Resource Management in Server Systems", Retrieved From: usenix.org/legacy/events/osdi99/full_papers/banga/banga.pdf, Proceedings of the 3rd Symposium on Operating Systems Design and Implementation., Feb. 1999, 15 Pages.

Castillo, et al., "Resource Co-Allocation for Large-Scale Distributed Environments", Retrieved From: dl.acm.org/citation.cfm?id=1551634, Jun. 2009, 10 Pages.

Gupta, et al., "Resource Partitioning for Multi-Party Real-Time Communication", Retrieved From: citeseerx.ist.psu.edu/viewdoc/download?doi=10.1.1.53.1748&rep=rep1&type=pdf, Nov. 1994, 22 pages.

Kichkaylo, et al., "Optimal Resource-Aware Deployment Planning for Component-based Distributed Applications", Retrieved From: ieeexplore.ieee.org/stamp/stamp.jsp?tp=&arnumber=1323517, 2004, 10 Pages.

Lakew, et al.,"Management of Distributed Resource Allocations in Multi-cluster Environments", Retrieved From: ieeexplore.ieee.org/xpl/login.jsp?tp=&arnumber=6407768, Jun. 2009, 10 Pages.

Lakshmanan, et al., "Distributed Resource Kernels: OS Support for End-To-End Resource Isolation", Retrieved From: ece.cmu.edu/-

(56) References Cited

OTHER PUBLICATIONS klakshma/pubs/rtas_08.pdf, Proceedings of the IEEE Real-time and Embedded Technology and Applications Symposium (RTAS), Apr. 2008, 10 Pages.

Liu, et al., "Adaptive Entitlement Control of Resource Containers on Shared Servers", Retrieved From: cs.mcgill.ca/-xueliu/publications/IM2005_Entitlement.pdf, 9th IFIP/IEEE International Symposium on Integrated Network Management, May 2005, 14 pages.

Mohit, et al., "Resource Containers and LRP", Retrieved From: cs.rice.edu/CS/Systems/ScalaServer/code/rescon-lrp/README.html, Sep. 22, 2010, 10 Pages.

Shankaran, et al.,' "Design and Performance Evaluation of an Adaptive Resource Management Framework for Distributed Real-Time and Embedded Systems", EURASIP Journal on Embedded Systems, vol. 2008, Article ID 250895, Retrieved From: cse.wustl.edu/~lu/papers/eurasip.pdf, Jan. 2, 2008, 20 Pages.

Wang, et al., "A Comprehensive Semantic-Based Resource Allocation Framework for Workflow Management Systems", Retrieved From: ieeexplore.ieee.org/stamp/stamp.jsp?tp=&arnumber=4575225, 2008, 4 Pages.

Zhang, et al., "A Dynamically Load and Upload Enabled Aggregation Model Based on the WPS", Retrieved From: isprs.org/proceedings/XXXVIII/part2/Papers/138_Paper.pdf, Joint International Conference on Theory, Data Handling and Modelling in GeoSpatial Information Science, May 2010, 6 Pages.

"Non-Final Office Action", U.S. Appl. No. 12/979,356, Jan. 2, 2015, 25 Pages.

"Foreign Notice of Allowance", CN Application No. 201110437575.6, Mar. 2, 2015, 4 pages.

\* cited by examiner

RESOURCE INDEX IDENTIFYING MULTIPLE RESOURCE INSTANCES AND SELECTING MOST APPROPRIATE UI RESOURCE INSTANCE BASED ON WEIGHTED RESOURCE REQUEST CONDITIONS

BACKGROUND

Applications running on a computer typically display a user interface for the user. Applications can be designed to, for example, customize different elements of the user interface to different languages on different computers. However, identifying which elements in which languages are available on a particular device can be problematic. Such identification can be a time consuming process, which degrades from the user experience when using the application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a request is received for a resource item. The request has one or more associated request conditions and is received from an application running on a computing device. A determination is made, at the computing device and based on a resource index that identifies multiple resource instances of the resource item each having zero or more resource instance conditions, of one of the multiple resource instances that satisfy the request conditions. This one resource instance is returned to the application.

In accordance with one or more aspects, a resource index is accessed. The resource index identifies, for each of multiple resource items, multiple resource instances associated with the resource item. Each of the multiple resource instances has zero or more resource instance conditions, and one or more request conditions of a potential context for running an application are obtained. Based on the one or more request conditions of the potential context and the zero or more resource instance conditions of the multiple resource instances, one or more potential errors in running the application in the potential context are identified, and an indication of the one or more potential errors is provided.

BRIEF DESCRIPTION OF THE DRAWINGS

The same numbers are used throughout the drawings to reference like features.

DETAILED DESCRIPTION

A resource index identifying multiple resource instances is discussed herein. The resource index maintains, for each of multiple different resource items (e.g., user interface (UI) resource items), multiple resource instances (e.g., multiple UI resource instances) of the resource item. Each of the multiple resource instances has zero or more resource instance conditions indicating when the resource instance is to be used. When a decision module receives a request from an application for a resource item, the decision module determines one or more of the multiple resource instances to be returned to the application. The decision module can make this determination based on which of the multiple resource instances have resource instance conditions that satisfy conditions associated with the request. The resource index can also be used to identify potential errors in running an application in a particular context by comparing conditions associated with the particular context to the resource instance conditions of multiple resource instances in the resource index. Based on this comparison, potential errors can be identified, such as whether the resource index includes no resource instances that satisfy the conditions associated with the particular context.

Figure 1:
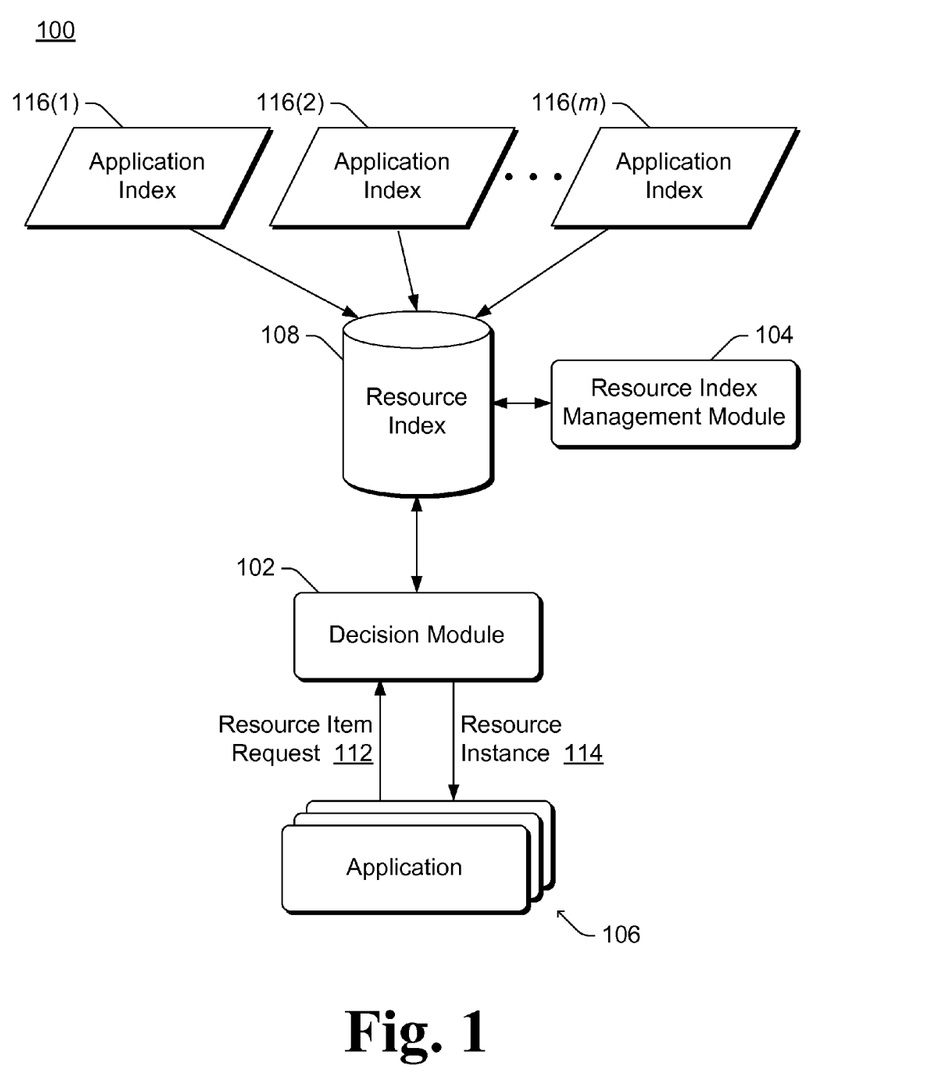
FIG. 1 illustrates an example system implementing the resource index identifying multiple resource instances in accordance with one or more embodiments.

FIG. 1 illustrates an example system 100 implementing the resource index identifying multiple resource instances in accordance with one or more embodiments. System 100 includes a decision module 102, a resource index management module 104, one or more applications 106, and a resource index 108. System 100 is implemented in a computing device, and can be implemented in a variety of different types of computing devices. For example, system 100 can be implemented in a desktop computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth.

System 100 can also be implemented in a multi-device (e.g., client/server devices, peer devices, etc.) environment, with communication between devices occurring over a wired and/or wireless connection or data network (e.g., a local area network, the Internet, a phone network, a universal serial bus (USB) connection, etc.). For example, an application 106 and decision module 102 can be implemented on different devices, resource index 108 can be implemented on one device and resource instances (discussed in more detail below) can be implemented on one or more other devices, and so forth. The techniques are discussed herein with some reference to user interface (UI) resource items and UI resource instances, although the techniques can alternatively be used with other types of resource items and resource instances as discussed below.

Each application 106 can obtain resources from decision module 102 by requesting a resource item 112 from decision module 102 and receiving one or more resource instances 114 from decision module 102. In one or more embodiments, each resource is data that is used to display or otherwise present at least part of the UI for the application. The resource can be the data itself that is displayed or otherwise presented, such as an image, an icon, text or other character strings, audio data, video data, and so forth. The resource can also be instructions or information that allow the resource to be displayed or otherwise presented, such as instructions in a scripting language (e.g., JavaScript™), instructions in a style sheet language (e.g., Cascading Style Sheets (CSS)), formats for displaying data (e.g., time and/or date formats, currency information), information regarding calendars, and so forth. Resources can be stored in different manners, such as in individual files (e.g., each individual file including a single resource) or in container files (e.g., each container file including multiple resources).

Each resource can be referred to as a resource item, which abstractly or generically identifies the resource. Each resource item typically has one or more associated resource instances, although in some situations a resource item may have no resource instances. Each resource instance is a particular value for the associated resource item and zero or more conditions under which that particular value is appropriate. Each application 106 typically has its own associated resource items and resource instances, although alternatively multiple applications can share resource items and/or resource instances.

Thus, a resource item can be viewed as a class of resource instances. For example, resource items can be a welcome string, a logo image, a layout CSS, a font CSS, and so forth. By way of further example, each resource instance of the welcome string resource item can include, for example, the welcome string in a particular language, the welcome string in a particular font type or font size, and so forth. By way of additional example, each resource instance of the logo image resource item can include, for example, a logo image in a particular resolution, a logo image in color or grayscale, and so forth.

Each resource instance has zero or more associated conditions under which a particular value for the resource item is appropriate. The conditions of a particular resource instance, also referred to as resource instance conditions, can vary based on the resource item of the instance. For example, the conditions associated with a particular resource instance can identify a language (e.g., English, French, German, Chinese, etc.) for which the particular value is appropriate, a particular country (e.g., United States, Great Britain, New Zealand, etc.) for which the particular value is appropriate, a particular dialect of a language (e.g., Mandarin, Cantonese, etc.) for which the particular value is appropriate, a particular resolution (e.g., 150 dots per inch (dpi), 600 dpi, etc.) for which the particular value is appropriate, a particular color setting (e.g., grayscale (or black and white), 8-bit color, 16-bit color, etc.) for which the particular value is appropriate, a particular orientation (e.g., landscape or portrait) for which the particular value is appropriate, a particular aspect ratio (e.g., 4:3 or 16:9) for which the particular value is appropriate, and so forth.

It should be noted that because the resource instance conditions refer to conditions under which a particular value for the resource item is appropriate, the conditions need not be specific characteristics of the particular value. For example, a particular image may have a resolution of 125 dpi, but a condition associated with that particular image may indicate that the particular image is appropriate for a resolution of 150 dpi. Alternatively, the resource instance conditions can be the characteristics of the particular value (e.g., the actual dpi of an image, the actual color setting of an image, and so forth).

Resource index 108 includes, for multiple resource items, the values of the associated resource instances (or references to the values of the resource instances) and one or more associated resource instance conditions. Resource index management module 104 manages resource index 108, including generating resource index 108 and adding data to resource index 108 as appropriate. Decision module 102 receives a request 112 from an application 106 for a resource item, the request 112 having one or more associated conditions (also referred to as request conditions). Decision module 102 accesses resource index 108 and determines, based on which of the multiple resource instances in resource index 108 have resource instance conditions that satisfy the conditions associated with request 112, one or more resource instances 114 to return to the requesting application 106. In one or more embodiments, a single resource index is used to store resource instances for multiple resource items of multiple applications 106. Alternatively multiple resource indexes 108 can be used, each storing resource instances for multiple resource items of a single application 106.

Figure 2:
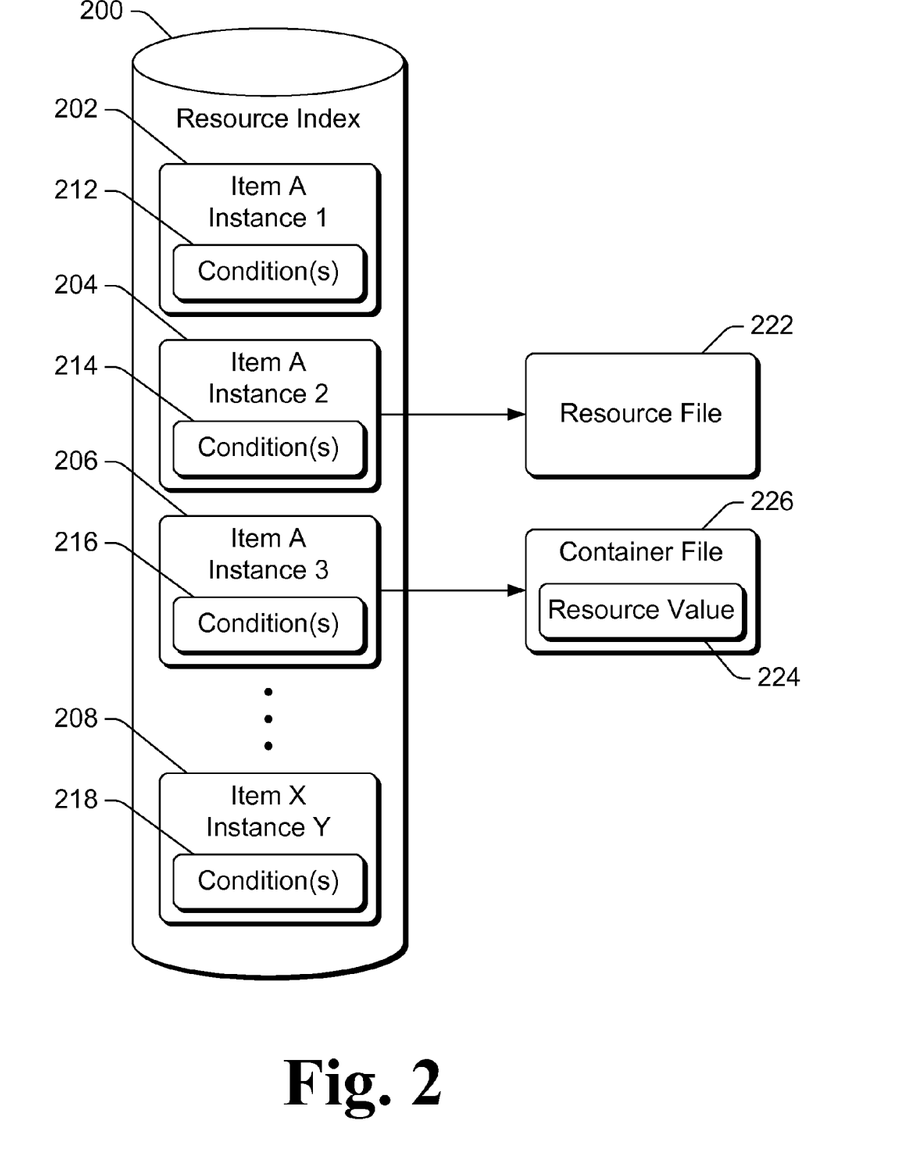
FIG. 2 illustrates an example resource index in accordance with one or more embodiments.

FIG. 2 illustrates an example resource index 200 in accordance with one or more embodiments. Resource index 200 can be, for example, resource index 108 of FIG. 1. Resource index 200 can be stored using a variety of different data or storage structures, such as using one or more tables, lists, databases, and so forth.

Resource index 200 includes multiple resource instances, illustrated as resource instances 202, 204, 206, and 208 in the example of FIG. 2. Each resource instance 202-208 is associated with a particular resource item. For example, resource instances 202, 204, and 206 are each different instances (instances 1, 2, 3) associated with the same resource item (item A). Each resource instance 202-208 has one or more conditions, illustrated as one or more conditions 212 of resource instance 202, one or more conditions 214 of resource instance 204, one or more conditions 216 of resource instance 206, and one or more conditions 218 of resource instance 208. Although each resource instance is illustrated in FIG. 2 as having one or more conditions, alternatively a resource instance can have no conditions.

Each resource instance in resource index 200 identifies the particular value (e.g., data, instructions, etc.) for that resource instance. Resource index 200 can identify the particular value in different manners, such as by including in resource index 200 the particular value for that resource instance, or by including in resource index 200 a reference to the particular value for that resource instance. A reference to the particular value indicates where the particular value can be obtained, such as a particular file (e.g., resource file 222), a portion of a container file (e.g., resource value 224 of container file 226), and so forth.

Returning to FIG. 1, in one or more embodiments resource index 108 is generated based on one or more (m) application indexes 116(1), . . . , 116(m). Each application 106 typically has one or more corresponding application indexes 116, although in some situations an application 106 may have no corresponding application index 116. Thus, multiple ones of application indexes 116 can correspond to the same application 106. Each application index 116 includes one or more resource instances associated with one or more resource items of the application 106. Different applications 106 can use different resource items, and the particular resource items and resource instances for a particular application 106 can be determined by the developer of the particular application 106.

Resource index management module 104 manages the obtaining of or generation of resource index 108, which can include the merging or combining of multiple application indexes 116 into the single resource index 108. Merging or combining application indexes 116 refers to creating a data or storage structure that includes the application indexes 116. Management module 104 can merge or combine application indexes 116 in a variety of different manners, depending at least in part on the data or storage structure used to store resource index 108. This merging or combining of application indexes 116 is also referred to as generating resource index 108, and this generating of resource index 108 can include generating a new data or storage structure and/or adding resource instances to a previously generated data or storage structure. Alternatively, resource index management module 104 can obtain resource index 108 from another component or device. Alternatively, module 104 can generate index 108 in other manners other than merging application indexes 116, such as building index 108 from other sources (e.g., applications 106).

Accordingly, it should be noted that resource index 108 can change over time as additional application indexes 116 are merged into resource index 108, and/or that resource index 108 can be re-generated over time to include additional application indexes 116. Additionally, it should be noted that if an application 106 were to be uninstalled from system 100, the one or more application indexes corresponding to that application 106 can also be removed from system 100. Resource index management module 104 can then re-generate resource index 108 without those removed one or more application indexes 116. Alternatively, at runtime an application 106 may unload a component, and resource index management module 104 can mark the resource instances associated with that component in resource index 108 as unavailable, or resource index 108 can be re-generated with resource instances associated with that component removed.

Resource index management module 104 can obtain application indexes 116 from one or more of a variety of different sources. For example, application indexes 116 can be obtained from an installer program that manages installation of an application 106 on system 100 and/or a manifest associated with an application 106 being installed on system 100. By way of another example, application indexes 116 can be obtained from another device or system, such as a remote service from which an application 106 is purchased, downloaded, or otherwise obtained. By way of yet another example, application indexes 116 can be obtained from another module or component of system 100.

Resource index management module 104 can generate resource index 108 at a variety of different times and/or in response to a variety of different events. For example, management module 104 can generate resource index 108 when an application 106 is installed on system 100 or when an update to an application 106 is installed on system 100. By way of another example, management module 104 can generate resource index 108 during runtime (while application 106 is running), such as in response to a request from an application 106. E.g., an application 106 may download or otherwise obtain an application index 116, and identify that application index 116 to management module 104 to merge into resource index 108. Alternatively, management module 104 can generate resource index 108 at other times, such as during periods of inactivity, at particular scheduled times, and so forth.

It should also be noted that different application indexes 116 used by the same application 106 can be merged into resource index 108 at different times. For example, one application index 116 for an application 106 can be merged into resource index 108 when application 106 is installed on system 100. Another application index 116 for the same application 106 can be merged into resource index 108 at a later time (e.g., after a period of hours, days, months, etc.) when an update to application 106 is installed on system 100. Yet another application index 116 for the same application 106 can be merged into resource index 108 at an even later time (e.g., after a period of hours, days, months, etc.) when the same application 106 obtains an application index 116 for that application 106. By way of another example, application indexes 116 can be merged into resource index 108 during installation of application 106 on system 100, when application 106 is being serviced (e.g., when application 106 is not running, or in the background while application 106 is running), when application 106 is launched, while application 106 is running, and so forth.

When an application 106 desires to display or otherwise present or access resources, the application 106 provides resource item request 112 to decision module 102. An application 106 running on (or for which execution is being initiated on) system 100 has a corresponding context. The context of application 106 describes various characteristics of the environment in which (or manner in which) application 106 is run. Different characteristics can be included as the context of application 106, analogous to the conditions discussed above regarding resource instances (e.g., any information that can be a condition of a resource instance can also be part of the context of application 106). The context of application 106 can include, for example, a current language being used by application 106 or that is requested by a user of system 100, a current orientation (e.g., landscape or portrait) of a device implementing system 100, a current resolution for a screen (or portion of a screen) on which application 106 is displaying the UI, and so forth.

Resource item request 112 identifies both a resource item and one or more request conditions associated with that request 112. These one or more request conditions are conditions that are to be satisfied by decision module 102 in determining which one or more resource instances of the requested resource item are to be returned to the application 106. The request conditions are at least part of the context of application 106, and can be included by application 106 as part of request 112. In addition to, or in place of, request conditions included as part of request 112, the context of application 106 can be identified by decision module 102 in other manners. For example, an indication of a preferred language of a current user of system 100 (and thus assumed to be the current user of application 106) can be obtained from another module or component (e.g., an operating system registry or other store of an operating system running on system 100). By way of another example, a current orientation of a device implementing system 100 can be obtained from another module or sensor of the computing device.

It should also be noted that, although request 112 is discussed herein as a request for a resource item, multiple requests for multiple different resource items can be included together. For example, if an application 106 desires five different resource items, application 106 can provide five different requests 112 to decision module 102 (one request 112 for each desired resource item). Alternatively, application 106 can provide fewer than five different requests 112 to decision module 102, such as a single request 112 that identifies each of the five desired resource items.

Request 112 can also include an indication of application 106. This indication can be inherent in request 112 (e.g., based on the manner in which application 106 provides request 112 to decision module 102), or alternatively can be explicit in request 112 (e.g., an identifier of the application 106 can be included in request 112).

Decision module 102 receives request 112 from an application 106 for a resource item and determines, based on which of the multiple resource instances in resource index 108 has conditions that satisfy the one or more request conditions associated with request 112, one or more resource instances 114 to return to the requesting application 106. As a single resource instance can have multiple resource instance conditions, and a request 112 can have multiple request conditions, this determination by decision module 102 is also referred to as a multi-dimensional (multi-condition) decision. Furthermore, as resource index 108 can include multiple resource instance conditions associated with each resource instance, resource index 108 is also referred to as a multi-dimensional index.

In response to a request 112, decision module 102 identifies the resource item being requested. Decision module 102 compares the request conditions associated with request 112 to the resource instance conditions of each of one or more of the resource instances in resource index 108 that are associated with the resource item being requested, and identifies one or more resource instances having resource instance conditions that satisfy those request conditions. Decision module 102 compares the request conditions to the resource instance conditions of one or more of the resource instances in resource index 108 that correspond to the application 106 from which request 112 is received. Thus, in situations in which resource index 108 includes resource instances for multiple different applications 106, decision module 102 need not access the resource instances that do not correspond to the application 106 from which the request 112 was received.

Decision module 102 can compare the requested conditions to the resource instance conditions of a resource instance using a variety of different operators to determine whether the resource instance conditions satisfy the request conditions. Examples of such operators include a "matches" or "is equal to" operator, a "less than" or "less than or equal to" operator, a "greater than" or "greater than or equal to" operator, and so forth. For example, a request condition can be a particular language and the operator can be "matches", and decision module 102 determines that a resource instance condition satisfies the language request condition only if that resource instance condition specifies a language that matches (e.g., is the same as) the particular language in the request condition. By way of another example, a request condition can be a particular resolution and the operator can be "less than or equal to", and decision module 102 determines that the resource instance condition satisfies the resolution request condition only if that resource instance condition specifies a resolution that is less than or equal to the resolution in the request condition.

It should be noted that some operators can be binary, providing a result that is either true or false to indicate whether a resource instance condition satisfies a request condition (e.g., a result that two values are or are not equal to each other, a result that one value is or is not less than another, etc.). However, other operators can provide a result that is a degree to which (e.g., a numerical value or other value in a known ordering) a request condition satisfies a resource instance condition. For example, the request condition for a language of "English-US" can satisfy the resource instance condition "matches English-US" best, can satisfy the resource instance condition "matches English" good but not as well, and can satisfy the resource instance condition "matches English-Great Britain" poorly. A degree to which the request condition satisfies each resource instance condition can be determined, such as a value (e.g., on a scale of 1 to 10, with 10 being satisfies the best) of 10 for the resource instance condition "matches English-US", a value of 7 for the resource instance condition "matches English", and a value of "2" for the resource instance condition "matches English-Great Britain". Alternatively, the resource instance with the resource instance condition of the highest degree (e.g., having the largest value or that is satisfied by the request condition the best) can be determined by decision module 102 to be the resource instance condition that satisfies the request condition.

Decision module 102 can use different operators for different conditions, and the particular operator to use can be determined in different manners. In one or more embodiments, the operator to use for each request condition is included as part of request 112. Alternatively, the operator to use for a particular resource instance condition can be included as part of the resource instance that includes that particular resource instance condition. Alternatively, the operator to use can be determined in different manners, such as based on a configuration setting of decision module 102 (e.g., decision module 102 can be pre-configured with the operator to use), based on an indication obtained from another module or system, and so forth.

As discussed above, multiple conditions can be associated with request 112. In one or more embodiments, a particular resource instance satisfies the request conditions associated with request 112 only if the resource instance conditions of that particular resource instance satisfy all of the request conditions associated with request 112. For example, if request 112 includes conditions that identify a language of English, a country of Great Britain, and a resolution of 150 dpi, then a particular resource instance satisfies the request conditions associated with request 112 only if all three of these conditions are satisfied by conditions of the resource instance.

In other embodiments, a particular resource instance satisfies the request conditions associated with request 112 if one or more of the resource instance conditions of that particular resource instance satisfy one or more of the request conditions associated with request 112. How many request conditions are to be satisfied can be a fixed number (e.g., at least 3 or 7 request conditions), or a relative number (e.g., at least 70% of the number of request conditions). Additionally, different request conditions can have different weights. Decision module 102 can identify these weights in different manners, such as identifying weights specified in request 112 (e.g., allowing applications 106 to determine the weights), being pre-configured with the weights, obtaining the weights from another system or module, and so forth. How many request conditions are to be satisfied can be based on these weights. For example, a language request condition may have a weight of 7, a country request condition may have a weight of 4, a resolution request condition may have a weight of 1, and an orientation request condition may have a weight of 1, and the resource instance satisfies the request conditions if the weights of the request conditions that are satisfied have a combined (e.g., summed) value of 12 or greater. Thus, in this example, for a resource instance to satisfy the request conditions associated with request 112, the language resource instance condition and country resource instance condition of that resource instance would need to satisfy the language request condition and country request condition associated with that request 112, and one or both of the resolution resource instance condition and the orientation resource instance condition of that resource instance would need to satisfy the resolution request condition and orientation request condition associated with that request 112.

Additionally, in one or more embodiments a resource instance may have no resource instance conditions, indicating that the resource instance is neutral and satisfies the request conditions regardless of the request conditions. In other embodiments, rather than having zero resource instance conditions, an "always true" operator can be used to indicate that the resource instance always satisfies the request conditions. Alternatively, an operator can be "includes at least x", where "x" represents some number, and the resource instance satisfies the request conditions if the resource instance has at least "x" resource instance conditions.

It should be noted that situations can arise in which none of the resource instances satisfy the request conditions associated with request 112. In such situations, decision module 102 can identify a resource instance that is a most appropriate resource instance for request 112. Decision module 102 can identify the resource instance that is the most appropriate resource instance for request 112 in a variety of different manners, such as selecting the resource instance having a largest number of resource instance conditions that satisfy request conditions associated with request 112, selecting the resource instance satisfying the largest combined (e.g., summed) weights of request conditions associated with request 112, selecting the resource instance having a resource instance condition closest to the request conditions associated with request 112 (e.g., if the request condition is for an image with a resolution of 150 dpi, then selecting the resource instance having a resource instance condition that is closest to 150 dpi), and so forth.

Additionally, one of the resource instances of a resource item can be a default resource instance or fallback resource instance for the resource item. Which resource instance is the default or fallback resource can be identified in different manners, such as being specified in application index 116 and included in resource index 108. Decision module 102 can identify this default or fallback resource instance as the most appropriate instance for request 112, and return this default or fallback resource as resource instance 114 if none of the resource instances satisfy the request conditions associated with request 112.

In one or more embodiments, decision module 102 returns a single resource instance 114 to the application 106 in response to request 112, the single resource instance satisfying the request conditions associated with request 112. Alternatively, if multiple resource instances satisfy the request conditions associated with request 112, then those multiple resource instances can be returned to the application 106. In other alternatives, other resource instances can be returned, such as the resource instance that is the most appropriate resource instance, all resource instances having at least one resource instance condition that satisfies a request condition associated with request 112, all of the resource instances associated with the requested resource item, and so forth.

In situations in which multiple resource instances are returned to an application 106, those multiple resource instances can be returned with a particular ordering. This ordering can be generated in a variety of different manners. In one or more embodiments, the multiple resource instances are ranked from a most appropriate resource instance to a least appropriate resource instance. This ranking can be generated in different manners, such as a resource instance having a larger number of resource instance conditions that satisfy request conditions associated with request 112 being ranked as more appropriate than a resource instance having a smaller number of resource instance conditions that satisfy request conditions associated with request 112, a resource instance having resource instance conditions that satisfy a larger combined (e.g., summed) weight of request conditions associated with request 112 being ranked as more appropriate than a resource instance having resource instance conditions that satisfy a smaller combined (e.g., summed) weight of request conditions associated with request 112, and so forth As discussed above, resource index 108 can include the actual values of the resource instances, or alternatively references to the actual values of the resource instances. Thus, it should be noted that the resource instance 114 returned to application 106 can be the actual value of the resource instance, or alternatively can be a reference to the actual value of the resource instance.

In one or more embodiments, decision module 102 also maintains a cache of results from determining whether particular request conditions associated with a request are satisfied by a particular one or more resource instances, as well as that particular resource instance. Decision module 102 can maintain this cache across multiple executions (e.g., of system 100 being executed), such as by storing the cache in a nonvolatile memory or storage device or remote service, allowing the cache to be used across different executions. In response to a request 112, decision module 102 checks the cache and, if the request conditions associated with the request 112 are included in the cache, then the particular one or more resource instances that satisfy those request conditions (as identified in the cache) is returned as resource instance 114.

In the discussions herein, some reference is made to UI resource items and UI resource instances. However, it should be noted that the techniques discussed herein can be used analogously with other types of resource items that are not UI resource items, and with other types of resource instances that are not UI resource instances. For example, the techniques discussed herein can be used with different platform dependent code or modules. Request 112 can be a request for code or a module and request 112 has one or more associated conditions (e.g., whether a device implementing system 100 is a mobile device or a desktop device, a particular manufacturer of the device implementing system 100, etc.). Decision module 102 receives request 112, and returns the resource instance (the instance of the code or module) that satisfies the requested conditions.

Figure 3:
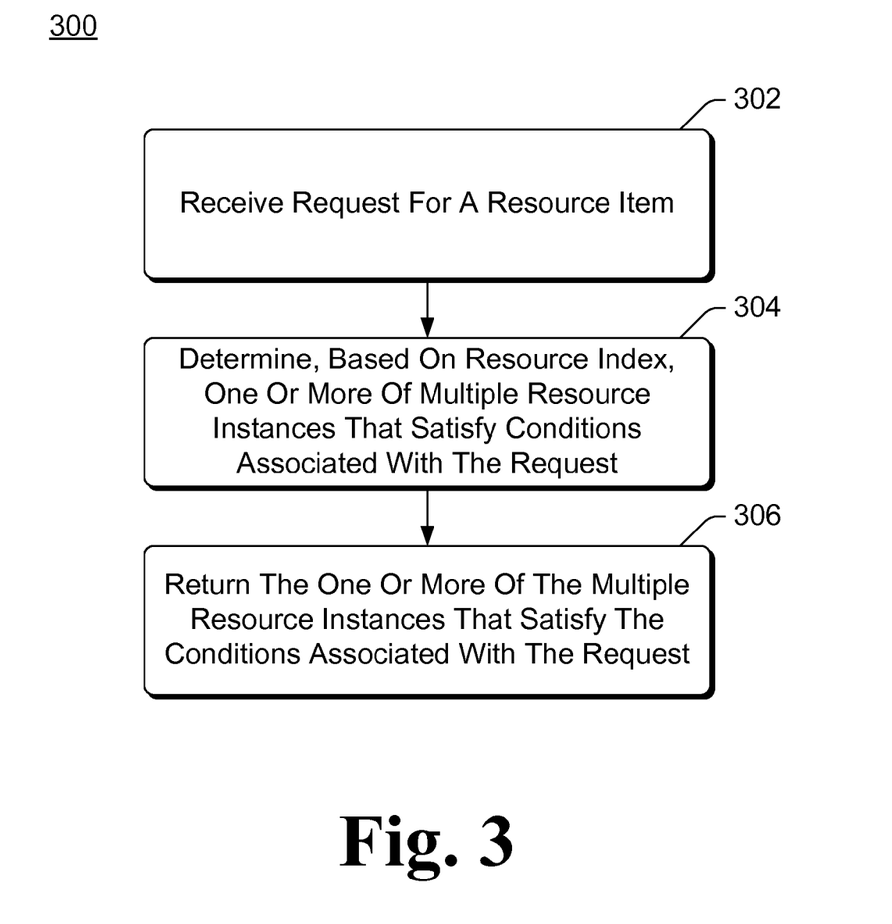
FIG. 3 is a flowchart illustrating an example process for using the resource index identifying multiple resource instances in accordance with one or more embodiments.

FIG. 3 is a flowchart illustrating an example process 300 for using the resource index identifying multiple resource instances in accordance with one or more embodiments. Process 300 is carried out by a decision module of a system, such as a decision module 102 of FIG. 1, and can be implemented in software, firmware, hardware, or combinations thereof. Process 300 is shown as a set of acts and is not limited to the order shown for performing the operations of the various acts. Process 300 is an example process for using the resource index identifying multiple resource instances; additional discussions of using the resource index identifying multiple resource instances are included herein with reference to different figures.

In process 300, a request for a resource item is received from an application (act 302). Associated with the request are one or more request conditions, and these can be included as part of the request and/or obtained elsewhere as discussed above.

The decision module implementing process 300 determines, based on a resource index, one or more of multiple resource instances that satisfy the request conditions associated with the request (act 304). The decision module can determine which resource instances satisfy the request conditions associated with the request in a variety of different manners as discussed above.

The one or more of the multiple resource instances that satisfy the conditions associated with the request are returned (act 306). The one or more of the multiple resource instances are returned to the application from which the request was received in act 302. Additionally, if none of the multiple resource instances satisfy the conditions associated with the request, a most appropriate resource instance of the multiple resource instances can be returned in act 306, as discussed above.

Returning to FIG. 1, resource index 108 can also be used to identify potential errors in running application 106 in a particular context (with particular characteristics). In one or more embodiments resource index management module 104 identifies such potential errors. Although identification of potential errors is discussed herein as being performed by resource index management module 104, the identification can alternatively be performed by decision module 102 or another module (not shown) of system 100.

Resource index management module 104 can identify potential errors based on different potential contexts. A potential context refers to a context that may potentially be a context of application 106, although an application 106 need not have run and need not ever run having such a potential context. These different potential contexts can be identified in different manners, such as receiving indications of potential contexts from applications 106, receiving indications of potential contexts from other systems or modules, and so forth. These different potential contexts can also be identified based on resource index 108. For example, management module 104 can analyze resource index 108 to identify the different conditions of the different resource instances for resource items of an application in resource index 108, and then identify different possible combinations of those conditions as different potential contexts.

Resource index management module 104 identifies potential errors for a potential context by viewing the characteristics of the potential context as request conditions associated with a request from an application 106. Accordingly, these characteristics can also be referred to as request conditions of the potential context. A determination is made as to whether the resource conditions for a resource instance of each item for the application in resource index 108 satisfy the request conditions of the potential context. This determination can be performed by decision module 102 (e.g., as if the conditions of the potential context were conditions associated with a request from an application), or in a manner analogous to the operation of decision module 102 discussed above. If the resource conditions for resource instances of an item for the application do not satisfy the request conditions of the potential context, then a potential error exists for that potential context. This is referred to as a potential error because an application 106 need not have the potential context, rather an application 106 may have the potential context at some later time.

Management module 104 can provide an indication of such potential errors, optionally identifying the particular request conditions of the potential context that resulted in the potential error. The indication can also optionally include an indication of which one or more resource items for the application did not have an associated resource instance with resource conditions that satisfy the request conditions of the potential context. The indication of the potential error can be provided to, for example, an administrator or user of system 100, an application 106, another module or system, and so forth.

For example, a potential context could include conditions of a language of English, a country of New Zealand, and a resolution of 600 dpi. Resource index management module 104 can submit a request to decision module 102 to identify resource instances of one or more resource items having resource conditions that satisfy those three conditions. If no resource instance in resource index 108 for a particular resource item has resource conditions that satisfy those three conditions, then a potential error exists for that potential context. A potential error exists because if a request for that particular resource item, and associated with those three conditions, were to be submitted by an application 106, no resource instance in resource index 108 would have resource conditions that satisfy the conditions associated with the request. Resource index management module 104 can provide an indication of this potential error, and also optionally an indication of which resource items had no associated resource instances with resource conditions that satisfy those three conditions. For example, management module 104 can determine that a welcome string resource instance has resource instance conditions that match those three conditions, but that no logo resource instance has resource instance conditions that match those three conditions, and can thus provide an indication that the potential error is with the logo resource item.

Figure 4:
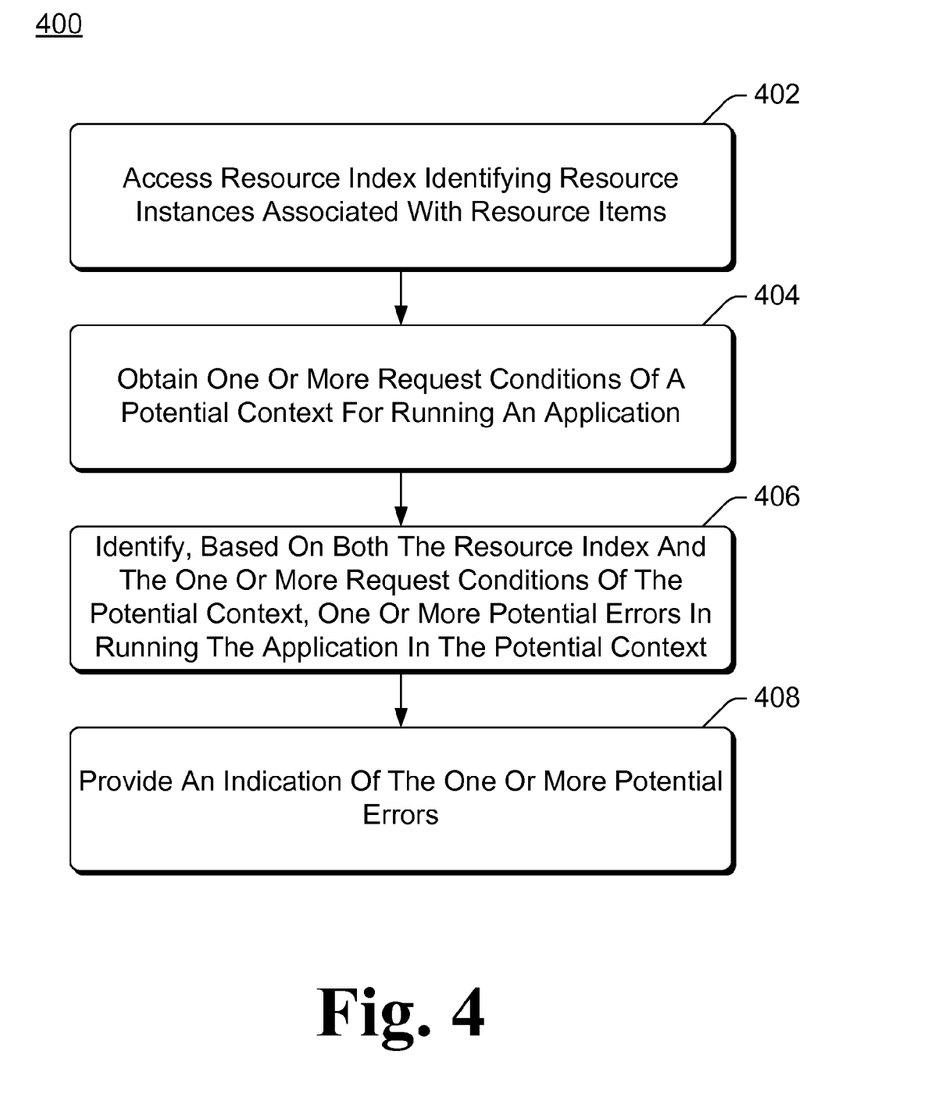
FIG. 4 is a flowchart illustrating an example process for identifying potential errors using a resource index identifying multiple resource instances in accordance with one or more embodiments.

FIG. 4 is a flowchart illustrating an example process 400 for identifying potential errors using a resource index identifying multiple resource instances in accordance with one or more embodiments. Process 400 is carried out by one or more modules of a system, such as a decision module 102 and resource index management module 104 of FIG. 1, and can be implemented in software, firmware, hardware, or combinations thereof. Process 400 is shown as a set of acts and is not limited to the order shown for performing the operations of the various acts. Process 400 is an example process for identifying potential errors using a resource index identifying multiple resource instances; additional discussions of identifying potential errors using a resource index identifying multiple resource instances are included herein with reference to different figures.

In process 400, a resource index identifying one or more resource instances associated with one or more resource items is accessed (act 402). Multiple resource instances associated with multiple different resource items can be included in the resource index, as discussed above.

One or more request conditions of a potential context for running an application are obtained (act 404). The potential context in act 404 need not have been, although alternatively can have been, a context in which an application was previously run by the system implementing process 400.

One or more potential errors in running the application in the potential context are identified (act 406). These potential errors are identified by determining whether resource conditions of a resource instance of one or more resource items in the resource index satisfy the one or more request conditions of the potential context, as discussed above.

An indication of the one or more potential errors, if any, is provided (act 408). This indication can be provided to an administrator, application, or other module or system as discussed above.

Figure 5:
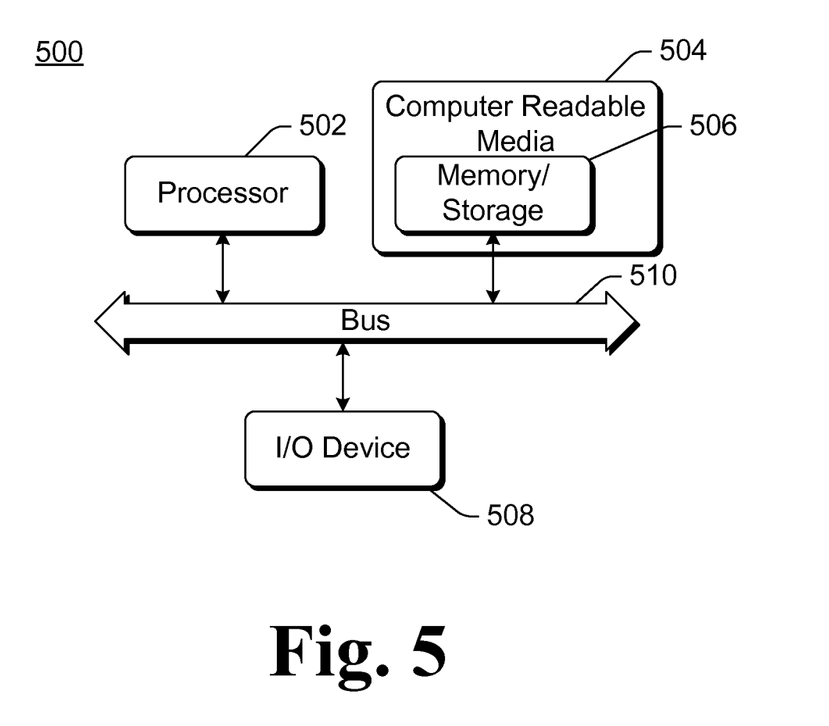
FIG. 5 illustrates an example computing device that can be configured to implement the resource index identifying multiple resource instances in accordance with one or more embodiments.

FIG. 5 illustrates an example computing device 500 that can be configured to implement the resource index identifying multiple resource instances in accordance with one or more embodiments. Computing device 500 can implement, for example, part of (or all of) system 100 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or nonvolatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, applications, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the resource index identifying multiple resource instances techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, from an application running on a computing device, a request for a user interface (UI) resource item, the request having one or more associated request conditions, the UI resource item generically identifying a UI resource and the UI resource item having multiple UI resource instances, each UI resource instance identifying a particular value for the UI resource item as well as one or more resource instance conditions under which the particular value for the UI resource item is appropriate, each of the one or more associated request conditions having different weights;
determining, at a decision module of the computing device and using a resource index that includes the multiple UI resource instances of the UI resource item on the computing device, one of the multiple UI resource instances that includes one or more resource instance conditions that satisfy the request conditions, the request conditions identifying one or more display characteristics desired by the application, the determining including applying the different weights of the one or more associated request conditions, wherein the determining further comprises
determining whether one or more of the multiple UI resource instances have resource instance conditions that satisfy all of the request conditions, and
identifying as the one UI resource instance a most appropriate UI resource instance of the multiple UI resource instances in response to one or more of the multiple UI resource instances not having resource conditions that satisfy all of the request conditions; and
returning, from the decision module, the one UI resource instance to the application.

2. A method as recited in claim 1, the returning the one UI resource instance comprising returning a value of the one UI resource instance or returning a reference to the value of the one UI resource instance.

3. A method as recited in claim 1, wherein the one of the multiple UI resource instances satisfies the request conditions if the one or more resource instance conditions of the one UI resource instance satisfy all of the request conditions.

4. A method as recited in claim 1, wherein the most appropriate UI resource instance of the multiple UI resource instance is a UI resource instance having resource instance conditions that satisfy a larger summed weight of the request conditions than other UI resources of the multiple UI resources.

5. A method as recited in claim 1, the returning further comprising returning, to the application, the one UI resource instance as well as one or more additional UI resource instances that satisfy the request conditions.

6. A method as recited in claim 5, the returning further comprising returning the one UI resource instance and the one or more additional UI resource instances ranked from the most appropriate UI resource instance to a least appropriate UI resource instance.

7. A method as recited in claim 1, further comprising generating the resource index during runtime of the application.

8. A method as recited in claim 1, further comprising generating the resource index by combining multiple application indexes received for the application.

9. A method as recited in claim 1, wherein one or more of the request conditions are received as part of the request.

10. A method as recited in claim 1, further comprising:
   obtaining one or more request conditions of a potential context for running the application, the potential context for running the application comprising a context that is potentially a context of the application regardless of whether the application was previously run having the context;
   identifying, based on the one or more request conditions of the potential context and the one or more resource instance conditions of the multiple UI resource instances, one or more potential errors in running the application in the potential context; and
   providing an indication of the one or more potential errors.

11. A method as recited in claim 1, wherein the one or more display characteristics include a language, a resolution, a color setting, an orientation, and an aspect ratio.

12. A computing device comprising:
   one or more processors; and
   one or more computer storage media having stored thereon multiple instructions that, when executed by the one or more processors, cause the one or more processors to:
      receive, from an application running on the computing device, a request for a user interface (UI) resource item, the request having multiple request conditions identifying one or more UI display characteristics desired by the application, each of the multiple request conditions having different weights;
      determine, at the computing device and based on a resource index that identifies multiple UI resource instances of the UI resource item, the UI resource item generically identifying a UI resource, each UI resource instance identifying particular data to be displayed as part of the UI for the application as well as one or more resource instance conditions under which the particular data for the UI resource item is appropriate, different UI resource instances identifying different particular data, one of the multiple UI resource instances that satisfies the request conditions, the resource index having been generated by including, in the resource index, multiple application indexes received at the computing device for the application, wherein the one of the multiple UI resource instances that satisfies the request conditions is a UI resource instance having resource conditions that satisfy the multiple request conditions;
      wherein to determine the one of the multiple UI resource instances that satisfies the request conditions is to apply the different weights of the multiple request conditions, determine whether one or more of the multiple UI resource instances have resource instance conditions that satisfy all of the request conditions, and identify as the one UI resource instance a most appropriate UI resource instance of the multiple UI resource instances in response to one or more of the multiple UI resource instances not having resource conditions that satisfy all of the request conditions; and
      return the one UI resource instance to the application, the one UI resource instance including a value of the one UI resource instance or a reference to the value of the one UI resource instance.

13. A computing device as recited in claim 12, wherein the most appropriate UI resource instance of the multiple UI resource instance is a UI resource instance having resource instance conditions that satisfy a larger summed weight of the request conditions than other UI resources of the multiple UI resources.

14. A computing device comprising:
   one or more processors; and
      one or more computer storage media having stored thereon multiple instructions that, when executed by the one or more processors, cause the one or more processors to perform acts comprising:
      receiving, from an application running on the computing device, a request for a user interface (UI) resource item, the request having one or more associated request conditions, the UI resource item generically identifying a UI resource and the UI resource item having multiple UI resource instances, each UI resource instance identifying a particular value for the UI resource item as well as one or more resource instance conditions under which the particular value for the UI resource item is appropriate, each of the one or more associated request conditions having different weights;
      determining, at a decision module of the computing device and using a resource index that includes the multiple UI resource instances of the UI resource item on the computing device, one of the multiple UI resource instances that includes one or more resource instance conditions that satisfy the request conditions, the request conditions identifying one or more display characteristics desired by the application, the determining including applying the different weights of the one or more associated request conditions, wherein the determining further comprises:
         determining whether one or more of the multiple UI resource instances have resource instance conditions that satisfy all of the request conditions, and
         identifying as the one UI resource instance a most appropriate UI resource instance of the multiple UI resource instances in response to one or more of the multiple UI resource instances not having resource conditions that satisfy all of the request conditions; and
      returning, from the decision module, the one UI resource instance to the application.

15. A computing device as recited in claim 14, the returning the one UI resource instance comprising returning a value of the one UI resource instance or returning a reference to the value of the one UI resource instance.

16. A computing device as recited in claim 14, wherein the most appropriate UI resource instance of the multiple UI resource instance is a UI resource instance having resource instance conditions that satisfy a larger summed weight of the request conditions than other UI resources of the multiple UI resources.

17. A computing device as recited in claim 14, the returning further comprising returning, to the application, the one UI resource instance as well as one or more additional UI resource instances that satisfy the request conditions.

18. A computing device as recited in claim 17, the returning further comprising returning the one UI resource instance and the one or more additional UI resource instances ranked from the most appropriate UI resource instance to a least appropriate UI resource instance.

19. A computing device as recited in claim 14, the acts further comprising generating the resource index during runtime of the application.

20. A computing device as recited in claim 14, the acts further comprising:
- obtaining one or more request conditions of a potential context for running the application, the potential context for running the application comprising a context that is potentially a context of the application regardless of whether the application was previously run having the context;
- identifying, based on the one or more request conditions of the potential context and the one or more resource instance conditions of the multiple UI resource instances, one or more potential errors in running the application in the potential context; and
- providing an indication of the one or more potential errors.

* * * * *